(12) United States Patent
He (10) Patent No.: US 8,612,540 B2
(45) Date of Patent: Dec. 17, 2013

(54) WIRELESS DATA CARD AND WORKING METHOD OF THE WIRELESS DATA CARD

(75) Inventor: Zhiqin He, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 27 days.

(21) Appl. No.: 13/069,838

(22) Filed: Mar. 23, 2011

(65) Prior Publication Data

US 2011/0173296 A1   Jul. 14, 2011

Related U.S. Application Data

(63) Continuation of application No. PCT/CN2009/073979, filed on Sep. 16, 2009.

(30) Foreign Application Priority Data

Sep. 24, 2008   (CN) .......................... 2008 1 0161269

(51) Int. Cl.
*H04L 12/28* (2006.01)
(52) U.S. Cl.
USPC ........................................................ 709/217
(58) Field of Classification Search
None
See application file for complete search history.

(56) References Cited

U.S. PATENT DOCUMENTS

| 7,421,266 | B1 | 9/2008 | Bruestle et al. | |
|---|---|---|---|---|
| 2004/0054797 | A1 | 3/2004 | Lin et al. | |
| 2005/0282573 | A1 | 12/2005 | Maeno | |
| 2006/0068795 | A1 | 3/2006 | Caspi et al. | |
| 2007/0073819 | A1* | 3/2007 | Gardner et al. | 709/206 |
| 2008/0313050 | A1* | 12/2008 | Basir | 709/217 |
| 2009/0252063 | A1* | 10/2009 | Owen et al. | 370/255 |
| 2010/0121946 | A1* | 5/2010 | Claes et al. | 709/223 |
| 2010/0268823 | A1* | 10/2010 | Torarp et al. | 709/225 |

FOREIGN PATENT DOCUMENTS

| CN | 101075178 A | 11/2007 |
|---|---|---|
| CN | 101141354 A | 3/2008 |
| CN | 101175311 A | 5/2008 |
| CN | 101686263 A | 3/2010 |
| JP | 2003-333066 A | 11/2003 |
| JP | 2005-33296 A | 2/2005 |
| JP | 2005-86720 A | 3/2005 |
| JP | 2006-5577 A | 1/2006 |
| JP | 2007-258816 A | 10/2007 |
| WO | WO 2008/052407 A1 | 5/2008 |

OTHER PUBLICATIONS

International Search Report, PCT/CN2009/073979, mailed Dec. 10, 2009, 4 pages.

(Continued)

*Primary Examiner* — Hassan Phillips
*Assistant Examiner* — Omeed D Rahgozar
(74) *Attorney, Agent, or Firm* — Slater & Matsil, L.L.P.

(57) ABSTRACT

A wireless data card includes a detecting module that is adapted to send a notification message to an executing module after detecting a DNS resolution request sent by a computer and detecting that no user account information exists in the wireless data card. An executing module is adapted to receive the notification message sent by the detecting module, to send prompt information to the computer so as to prompt a user to input the user account information, and to write the input user account information into the wireless data card so that the computer can use the user account information to access the Internet through the wireless data card.

14 Claims, 4 Drawing Sheets

(56) References Cited

OTHER PUBLICATIONS

Written Opinion of the International Searching Authority, PCT/CN2009/073979, mailed Dec. 10, 2009, 3 pages.
Written Opinion of the International Searching Authority and Translation received in Patent Cooperation Treaty Application No. PCT/CN2009/073979, mailed Dec. 10, 2009, 3 pages.
"Device driver," from Wikipedia, the free encyclopedia, Sep. 19, 2008, 5 pages.
European search report received in European Patent Office Application No. 09817229-1525, Applicant Huawei Device Co., Ltd., mailed Oct. 17, 2012, 9 pages.
"ICE D-20 EC506 Wireless Broadband Gateway User Guide," Manual Version 03, Huawei Technologies Co., Ltd., Apr. 19, 2007, 45 pages.
Ott, et al., "Towards Automated Authentication for Mobile Users in WLAN Hot-Spots," IEEE, 2005, 10 pages.
Notice of Reasons for Rejection received in Patent Application No. 2011-527167 mailed Oct. 30, 2012, 5 pages. (Partial Translation).

* cited by examiner

WIRELESS DATA CARD AND WORKING METHOD OF THE WIRELESS DATA CARD

This application is a continuation of co-pending International Application No. PCT/CN2009/073979, filed on Sep. 16, 2009, which claims priority to Chinese Patent Application No. 200810161269.2, filed on Sep. 24, 2008, both of which applications are incorporated herein by reference.

TECHNICAL FIELD

The present invention relates to the communication field, and in particular, to a wireless data card and a working method of the wireless data card.

BACKGROUND

A Network Interface Card (NIC) is an apparatus installed in a computer for connecting the computer to a Local Area Network (LAN). The NIC works as an interface connecting the computer and the network transmission medium to implement physical connection and electrical signal matching between the computer and the network transmission medium, and is responsible for sending and receiving data frames, encapsulating and decapsulating data frames, encoding and decoding data, buffering data, and controlling medium access.

A traditional Ethernet NIC is of single-function and runs in a simple environment. Usually, only a Media Access Control (MAC) address is programmed in the NIC in the manufacturing process. In the physical transmission process at the lower layer of the network, the host is identified by the MAC address.

When an NIC is installed, drivers for managing the NIC need to be installed in the operating system of the computer. Currently, built-in drivers for NICs of various manufacturers are generally configured in a Windows operating system. Therefore, the Ethernet NICs are generally plug-and-play.

However, a wireless data card capable of broadband wireless network communications runs in an environment which is much more complicated than the wired Ethernet NIC, and involves massive data to be configured according to the wireless network environment. Meanwhile, the wireless data card differs from the wired Ethernet NIC in that the wireless data card needs to provide device authentication and user authentication functions.

In a traditional solution, a driver Compact Disk-Read Only Memory (CD-ROM) is attached to the wireless data card as control software of the wireless data card. That is, before the wireless data card works, the user needs to install the driver of the wireless data card by using the driver CD-ROM, and configure authentication information.

In the process of implementing the present invention, the inventor finds at least the following problems in the prior art: When the user replaces a computer and wants to use the wireless data card on the new computer, the user has to install the driver of the wireless data card again, which is troublesome. Moreover, the driver CD-ROM is vulnerable to loss, which brings much inconvenience to the user.

SUMMARY OF THE INVENTION

The embodiments of the present invention provide a wireless data card which enables the user to access a wireless network without installing any program in the operating system of a computer.

A wireless data card is provided in an embodiment of the present invention. The wireless data card is connected to a computer and includes:

a detecting module, adapted to send a notification message after detecting a Domain Name System (DNS) resolution request sent by the computer and detecting that no user account information exists in the wireless data card; and an executing module, adapted to: receive the notification message sent by the detecting module, send prompt information to the computer so as to prompt a user to input the user account information, and write the input user account information into the wireless data card so that the computer can use the user account information to access the Internet through the wireless data card.

A working method of a wireless data card is provided in an embodiment of the present invention. The wireless data card is connected to a computer, and the working method includes:

sending prompt information to the computer after detecting a DNS resolution request sent by the computer and detecting that no user account information exists in the wireless data card, where the prompt information prompts a user to input the user account information; and writing the input user account information into the wireless data card so that the computer can use the user account information to access the Internet through the wireless data card.

The wireless data card and its working method under the present invention make it unnecessary to install drivers, avoid the inconvenience caused by loss of the driver CD-ROM, require no extra memory, and facilitate the user at a low cost.

DETAILED DESCRIPTION OF ILLUSTRATIVE EMBODIMENTS

The embodiments of the present invention are described below with reference to the accompanying drawings.

Embodiment 1

Figure 1:
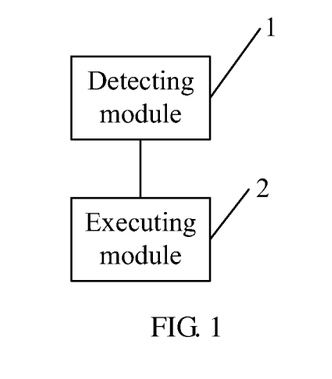
FIG. 1 is a schematic diagram showing a structure of a wireless data card according to a first embodiment of the present invention.

FIG. 1 is a schematic diagram showing a structure of a wireless data card according to a first embodiment of the present invention. As shown in FIG. 1, the wireless data card according to this embodiment includes a detecting module 1 and an executing module 2.

In this embodiment, after the wireless data card is connected to the computer, the detecting module sends a notification message to the executing module 2 after detecting a DNS resolution request sent by the computer and detecting that no user account information exists in the wireless data card; after receiving the notification message sent from the detecting module 1, the executing module 2 sends prompt information to the computer to prompt the user to input the user account information, and writes the user account information into the wireless data card.

The foregoing actions such as detection and prompting occur only when the user uses the wireless data card to access the Internet for the first time. The prompt information may be given in a window or on a web page on the computer.

The computer uses the user account information to access the Internet through the wireless data card. Therefore, after the executing module writes the user account information, the computer can use the user account information directly, and the user can access a website to browse or download contents through the wireless data card. The user is free from the trouble of installing the drivers and the inconvenience caused by loss of the driver CD-ROM. The solution works at a low cost, without involving any extra memory.

Embodiment 2

Figure 2:
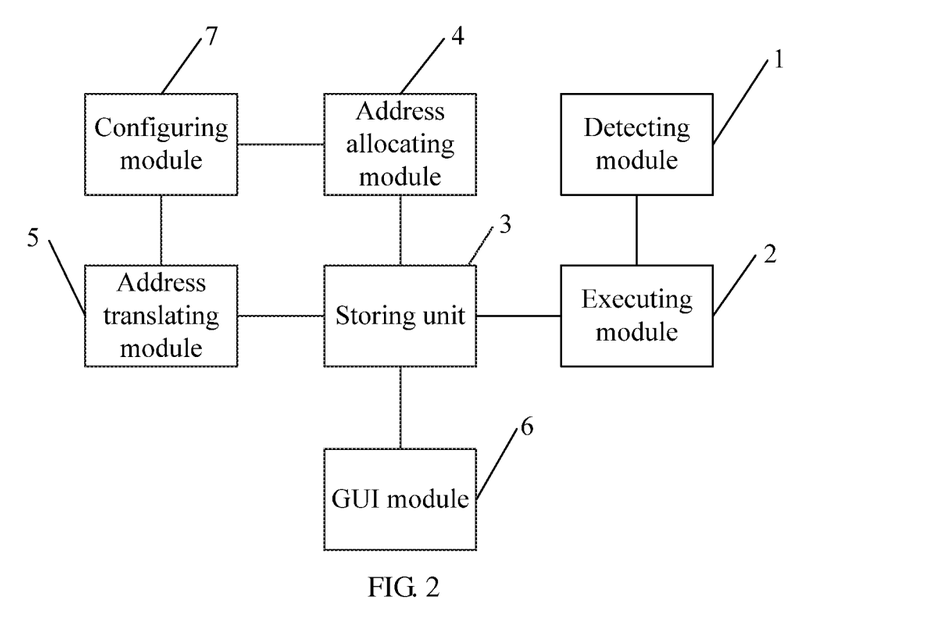
FIG. 2 is a schematic diagram showing a structure of a wireless data card according to a second embodiment of the present invention.

FIG. 2 is a schematic diagram showing a structure of a wireless data card according to the second embodiment of the present invention. As shown in FIG. 2, the wireless data card in this embodiment includes: a detecting module 1, an executing module 2, a storing unit 3, an address allocating module 4, an address translating module 5, a Graphic User Interface (GUI) module 6, and a configuring module 7.

Figure 5:
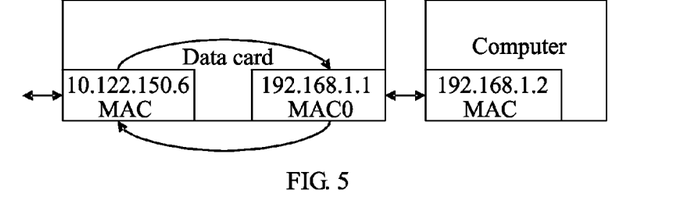
FIG. 5 is a schematic diagram showing the configuration of a MAC address according to the fourth embodiment of the present invention.

In this embodiment, the configuring module 7 configures, in the wireless data card, a first physical address for communicating with the computer and a second physical address (as shown in FIG. 5) for communications in the public network. Therefore, at the time of allocating an Internet Protocol (IP) address to the wireless data card, a private IP address corresponding to the first physical address and a public IP address corresponding to the second physical address are allocated to the wireless data card at the same time. For example, in FIG. 5, the private IP address corresponding to the first physical address is 192.168.1.1, and the public IP address corresponding to the second physical address is 10.122.150.6.

The foregoing physical address is also known as a hardware address or a MAC address. The physical address is programmed in the wireless data card, and includes an identifier of the LAN node. In the physical transmission process at the lower layer of the network, the host is identified by a physical address. That is, at the time of transmitting data, a physical address identifies the computer that sends or receives data. Generally, a physical address is globally unique.

In this embodiment, because the private IP address is never propagated in the public network, and is used only for communicating with the computer, all wireless data cards may have the same first physical address.

After the wireless data card is connected to the computer, the detecting module 1 sends a notification message to the executing module 2 after detecting a DNS resolution request sent by the computer and detecting that no user account information exists in the storing unit 3 of the wireless data card; after receiving the notification message sent from the detecting module 1, the executing module 2 sends prompt information to the computer through a window or a web page to prompt the user to input the user account information, and writes the user account information into the storing unit 3.

After the executing module 2 writes the user account information into the storing unit 3, the computer can use the user account information directly to access the Internet through the wireless data card. In this case, the address allocating module 4 allocates a private IP address to the computer, and the address translating module 5 translates the private IP address to the public IP address of the computer so that the computer can communicate with the Internet.

The address translating module 5 works in the following way:

Step 1: After the address allocating module 4 allocates a private IP address to the computer, the computer sends a packet to the address translating module 5 to access the Internet. The packet carries a destination address (IP address of the website to be accessed) and a source address (private IP address of the computer).

Step 2: The address translating module 5 translates the address, that is, modifies the source address in the packet to the public IP address of the computer, and then sends the modified packet to the website.

Step 3: The website feeds back a packet to the address translating module 5. In this packet, the source address is the IP address of the website, and the destination address is the public IP address of the computer.

Step 4: The address translating module 5 translates the address, that is, modifies the destination address in the packet sent by the website to the private IP address of the computer, and then sends the modified feedback packet to the computer.

Default account information is pre-stored in the storing unit 3. The default account information enables the computer to log in to the server of the operator of a wireless data card through the wireless data card to obtain the user account information for accessing any website.

In this embodiment, the wireless data card may further include a GUI module 6, which is adapted to provide the computer with a GUI, through which the wireless data card is monitored and configured and the user can see the running state and the statistic information of the wireless data card visually.

The wireless data card in this embodiment makes it unnecessary to install drivers, avoids the inconvenience caused by loss of the driver CD-ROM, requires no extra memory, and works at a low cost. The user is free from troublesome operations and configurations involved in the use of the wireless data card, and the GUI facilitates the user to view the running information.

Embodiment 3

Figure 3:
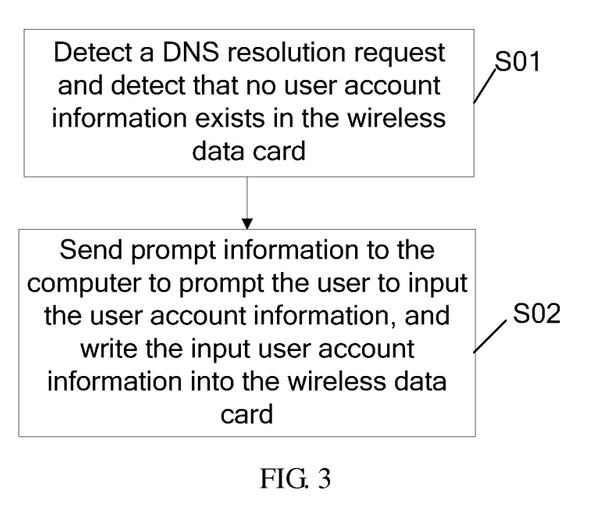
FIG. 3 is a schematic diagram showing a flowchart of a working method of a wireless data card according to a third embodiment of the present invention.

FIG. 3 is a schematic diagram showing the flowchart of a working method of a wireless data card according to the third embodiment of the present invention. As shown in FIG. 3, the method includes the following steps:

Step S01: Detect a DNS resolution request sent by the computer and detect that no user account information exists in the wireless data card.

Step S02: Send prompt information to the computer to prompt the user to input the user account information, and write the input user account information into the wireless data card.

In this embodiment, after the wireless data card is connected to the computer, the DNS resolution request sent by the computer is detected through step S01, and it is detected that no user account information exists in the storing unit of the wireless data card; then step S02 is performed, namely, prompt information is sent to the computer to prompt the user to input the user account information, and the user account information is written into the wireless data card.

The foregoing actions such as detection and prompting occur only when the user uses the wireless data card to access the Internet for the first time. The prompt information may be given in a window or on a web page on the computer.

The computer uses the user account information to access the Internet through the wireless data card. Therefore, after the executing module writes the user account information, the computer can use the user account information directly, and the user can access a website to browse or download contents through the wireless data card. The user is free from the trouble of installing the drivers and the inconvenience caused by loss of the driver CD-ROM. The solution works at a low cost, without involving any extra memory.

Embodiment 4

Figure 4:
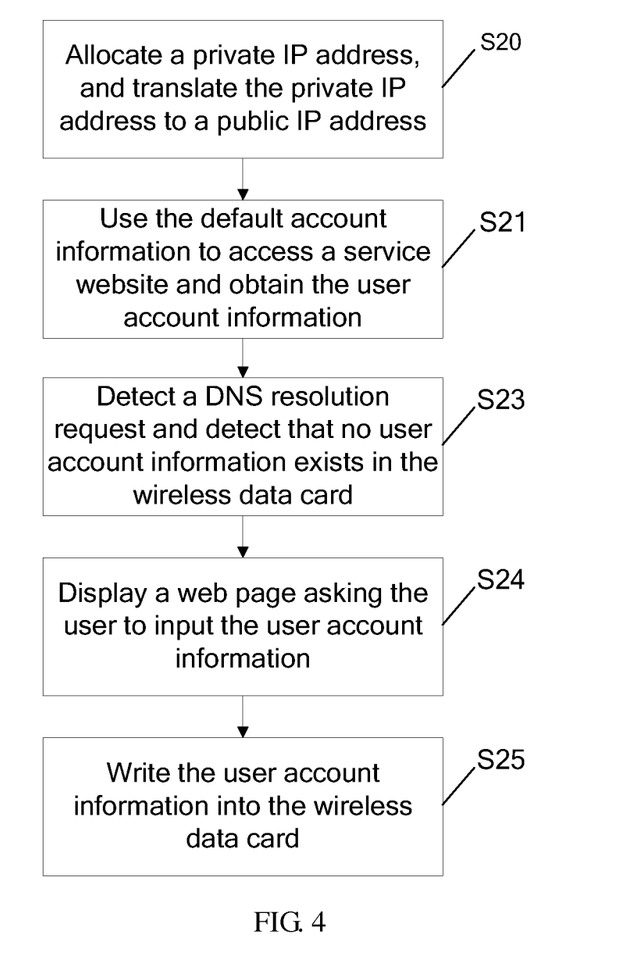
FIG. 4 is a schematic diagram showing a flowchart of a working method of a wireless data card according to a fourth embodiment of the present invention.

FIG. 4 is a schematic diagram showing the flowchart of a working method of a wireless data card according to the fourth embodiment of the present invention. As shown in FIG. 4, the method includes the following steps:

Step S20: Allocate a private IP address, and translate the private IP address to a public IP address.

Step S21: Use the default account information to access a service website and obtain the user account information.

Step S22: Detect a DNS resolution request and detect that no user account information exists in the wireless data card.

Step S23: Display a web page asking the user to input the user account information.

Step S24: Write the user account information into the data card.

In this embodiment, the configuration information required for initial access to the network is written into the wireless data card in the manufacturing process to ensure that the wireless data card enables initial access to the network. The configuration information includes: frequency for accessing the network, bandwidth, operator information, and MAC address. The configuration information may further include a certificate for initial authentication, or the authentication is performed through a Subscriber Identity Module (SIM) card.

To use the wireless data card, the user inserts the wireless data card into the computer so that the wireless data card is powered on initially through a Universal Serial Bus (USB) interface. At this time, both the downlink interface part and the uplink interface part of the wireless data card work simultaneously.

At the downlink interface part, the wireless data card starts its Dynamic Host Configuration Protocol (DHCP) module, Network Address Translation (NAT) module and DNS snooping module. The DHCP module allocates a private IP address to the computer into which the wireless data card is inserted. The NAT module translates the private IP address to the public IP address (step S20). After startup, the DNS snooping module keeps detecting whether the user accesses the Internet through the browser after the user account information is obtained, and whether the user has input the obtained user account information.

At the uplink interface part, a procedure for accessing the network initially is started, and the uplink channel is set up so that the user can use the default account information set in the wireless data card, to log in to the self-service website of the operator through a web browser. In the website, the user opens an account and purchases various wireless network services. In this way, the user account information is obtained (step S21). In step S21, the NAT module needs to perform translation between the public IP address and the private IP address so that the wireless data card can communicate with the self-service website.

After completion of opening the account, the user needs to reset the wireless data card. The wireless data card may be reset in this way: removing the wireless data card from the computer and then inserting it again; or obtaining the user account information from the self-service website of the operator, and then operating the management page offered by the wireless data card to reset the wireless data card.

Because the user account information has not been written into the wireless data card, the uplink interface part of the wireless data card is unable to access the website. In this case, if the user accesses the Internet through a web browser, because the DNS snooping module on the wireless data card detects the DNS resolution request of the user, and detects that no user account information is provided by the user (step S22), a web page for inputting the user account information prompts, asking the user to input the user account information (step S23). The method for detecting whether the user has obtained the user account information and written it into the wireless data card may be: detecting whether the user account information recorded in the wireless data card is still the default account information of the self-service website of the operator.

After the user inputs the user account information, the user account information is written into the wireless data card (step S24), and is stored. The wireless data card starts the normal procedure for accessing the network, and sets up a channel from the computer to the Internet. At this time, the user can use the web browser to access the Internet.

The following describes the configuration of the MAC address of the wireless data card provided in this embodiment. Because the wireless data card in this embodiment works as both a NIC of the computer and a network router, the wireless data card in this embodiment requires two MAC addresses. One is the MAC address for communications on the public network, and the other is the MAC address (MAC0) for communications with the computer. For the purpose of saving the MAC address resources, because MAC0 for the private network is never propagated in the public network, all the wireless data cards in this embodiment may have the same MAC address for the private network (namely, MAC0). In this way, supposing that there are N wireless data cards in this embodiment, the number of MAC addresses required by such wireless data cards is N+1, where N is the number of issued wireless data cards in this embodiment.

For the purpose of comparison, protocol models of a wireless data card and a wireless data card are illustrated with reference to FIG. 6 and FIG. 7.

Figure 6:
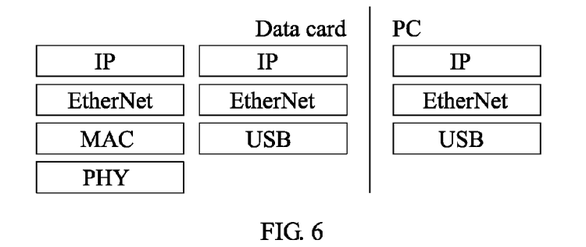
FIG. 6 is a schematic diagram showing a protocol model of a traditional wireless data card in the conventional art.

FIG. 6 shows a protocol model of a traditional wireless data card. As shown in FIG. 6, a traditional wireless data card includes an IP layer, an Ethernet layer, a physical layer interface (PHY), a MAC module, and a USB module. In this embodiment, the wireless data card with a USB interface is taken as an example. In other embodiments, if a wireless data card with a Peripheral Component Interconnect Express (PCI-E) interface is applied, the structure is similar except that the USB module in FIG. 6 is replaced with a PCI-E module.

Figure 7:
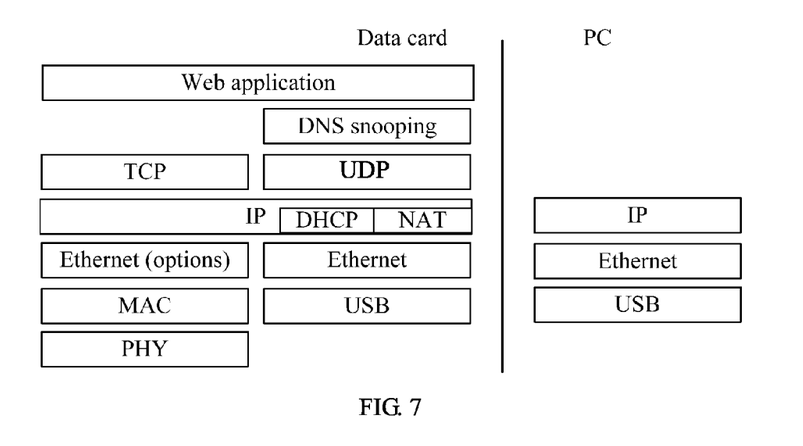
FIG. 7 is a schematic diagram showing a protocol model of the wireless data card based on the working method according to the fourth embodiment of the present invention.

FIG. 7 shows a protocol model of the wireless data card based on the working method provided in the fourth embodiment of the present invention. As shown in FIG. 7, this wireless data card differs from the traditional wireless data card in that a DHCP module and a NAT module are added to the IP layer, and that a Transport Control Protocol (TCP) module, a User Datagram Protocol (UDP) module, a DNS snooping module, and a web application module are added. The DHCP module is adapted to allocate a private IP address to the computer; the NAT module translates addresses between the private IP address and the public IP address of the computer; the TCP module enables the wireless data card to have the routing function; the DNS snooping module is adapted to: detect the user's DNS request, detect whether user account information is written into the wireless data card, and send an authentication web page; and the web application module works with the TCP module to provide the user with a GUI for monitoring and configuration.

A built-in TCP module capable of routing is deployed in the wireless data card so that the wireless data card is capable of processing upper-layer protocols. A web server may be set in the wireless data card so that the wireless data card can provide a GUI for monitoring and configuring the wireless data card. Through the GUI, the user views the running state and the static information of the wireless data card visually, without installing extra software in the computer.

In the embodiments described above, a Worldwide Interoperability for Microwave Access (WiMAX) wireless data card is taken as an example. However, the embodiments of the present invention are not limited to the WiMAX wireless data card, but are applicable in three 3G mobile communication standards: Wideband Code Division Multiple Access (WCDMA), CDMA2000 (also known as CDMA Multi-Carrier), and Time Division-Synchronous Code Division Multiple Access (TD-SCDMA).

It is apparent to persons skilled in the art that various modifications and variations can be made to the present invention without departing from the scope or spirit of the present invention. The present invention shall cover the modifications and variations provided that they fall within the scope of protection defined by the appended claims or their equivalents.

What is claimed is:

1. A wireless data card connected to a computer, the wireless data card comprising:
   a detecting module, configured to send a notification message after detecting a Domain Name System (DNS) resolution request sent by the computer and detecting that no user account information exists in the wireless data card;
   an executing module, configured to receive the notification message sent by the detecting module, to send prompt information to the computer so as to prompt a user to provide the user account information, and to write the user account information into the wireless data card so that the Internet is accessible through the computer via the wireless data card without installing any extra program beyond an operating system including a DNS program, a TCP program, a UDP program, and an IP program on the computer;
   an address allocating module, configured to allocate a private Internet Protocol (IP) address to the computer;
   an address translating module, configured to translate addresses between the private IP address and a public IP address of the computer;
   a Transport Control Protocol (TCP) module, configured to route the wireless data card so that the computer can access the Internet; and
   a storage unit, configured to store the user account information input by the user and preset default account information, wherein the default account information is used for logging in to a server of an operator of the wireless data card to obtain the user account information.

2. The wireless data card according to claim 1, further comprising:
   a Graphic User Interface (GUI) module, configured to provide the computer with a GUI for monitoring and configuring the wireless data card.

3. The wireless data card according to claim 1, further comprising:
   a configuring module, configured to configure the private IP address for communicating with the computer and the public IP address for communicating in a public network.

4. The wireless data card according to claim 3, wherein all wireless data cards have the same private IP address.

5. A method of operating a wireless data card that is connected to a computer, the method comprising:
   sending prompt information to the computer after detecting a Domain Name System (DNS) resolution request sent by the computer and detecting that no user account information exists in the wireless data card, wherein the prompt information prompts a user to input the user account information; and writing the input user account information into the wireless data card so that the computer can use the user account information to access the Internet through the wireless data card without installing any extra program beyond an operating system including a DNS program, a TCP program, a UDP program, and an IP program on the computer,
   allocating a private Internet Protocol (IP) address to the computer;
   translating addresses between the private IP address and a public IP address of the computer; and
   routing the wireless data card by a Transport Control Protocol (TCP) module so that the computer can access the Internet, the TCP module being included within the wireless data card.

6. The method according to claim 5, further comprising using default account information to log in to a server of an operator of the wireless data card to obtain the user account information.

7. The method according to claim 6, wherein the default account information is preset in the wireless data card.

8. The method according to claim 5, further comprising providing the computer with a Graphic User Interface (GUI) for monitoring and configuring the wireless data card.

9. The method according to claim 5, wherein the private IP address is for communicating with the computer and the public IP address is for communicating in a public network.

10. The method according to claim 9, wherein all wireless data cards have the same private IP address.

11. A method of operating a wireless data card that is connected to a computer, the method comprising:
    detecting a Domain Name System (DNS) resolution request sent by the computer and detecting that no user account information exists in the wireless data card;
    sending a notification message after detecting the DNS resolution request and detecting that no user account information exists in the wireless data card;
    in response to the notification message, sending prompt information to prompt a user to input the user account information; and
    writing the input user account information into the wireless data card so that the computer can use the user account information to access the Internet through the wireless data card without installing any extra program beyond an operating system including a DNS program, a TCP program, a UDP program, and an IP program on the computer,
    wherein said method further comprising:
    allocating a private Internet Protocol (IP) address to the computer;
    translating addresses between the private IP address and a public IP address of the computer;
    routing the wireless data card by a transport Control Protocol (TCP) module so that the computer can access the Internet, the TCP module being included within the wireless data card; and storing the user account information input by the user and preset default account information, wherein the default account information is used for logging in to a server of an operator of the wireless data card to obtain the user account information.

12. The method according to claim 11, further comprising providing the computer with a GUI for monitoring and configuring the wireless data card.

13. The method according to claim 11, further comprising configuring the private IP address for communicating with the computer and the public IP address for communicating in a public network.

14. The method according to claim 13, wherein all wireless data cards have the same private IP address.

* * * * *